UNITED STATES PATENT OFFICE.

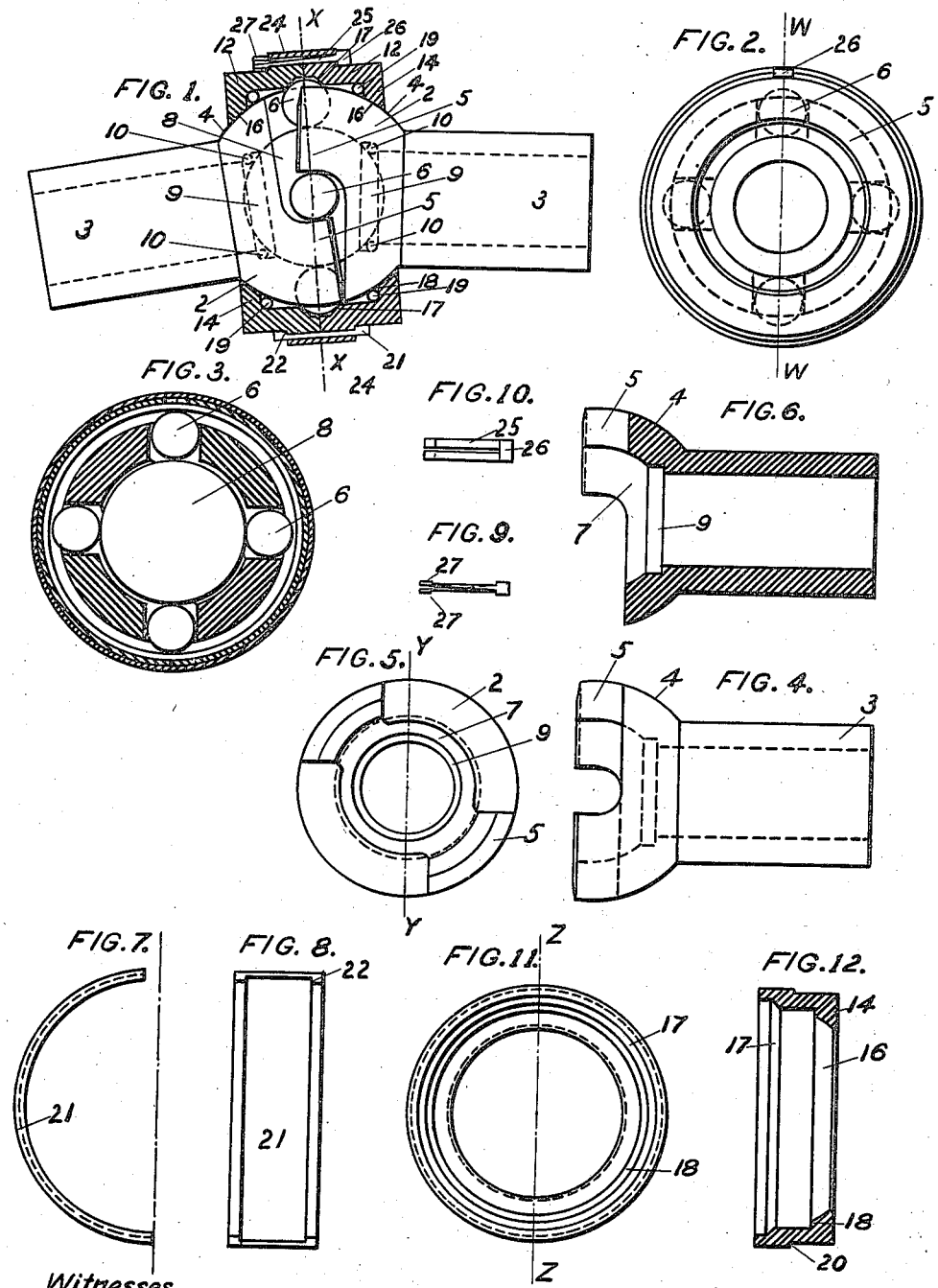

DEWITT TAPPAN, OF WATERVLIET, NEW YORK.

FLEXIBLE COUPLING.

1,160,213. Specification of Letters Patent. Patented Nov. 16, 1915.

Application filed October 3, 1913. Serial No. 793,173.

*To all whom it may concern:*

Be it known that I, DEWITT TAPPAN, a citizen of the United States, residing at Watervliet, in the county of Albany and State of New York, whose post-office address is as above, have invented certain new and useful Improvements in Flexible Couplings, of which the following is a specification.

This invention relates to flexible couplings for connecting shafts which are arranged out of line with each other or which are liable to variations in alinement; and it consists in the novel construction and combination of the parts hereinafter fully described and claimed.

In the drawings, Figure 1 is a side view of a flexible coupling constructed according to this invention and showing bearing rings and locking devices in section. Fig. 2 is an end view of the coupling. Fig. 3 is a cross-section through the coupling, taken on the line $x$—$x$ in Fig. 1. Fig. 4 is a detail side view of one coupling-member. Fig. 5 is an end view of the same. Fig. 6 is a longitudinal section through the coupling-member, taken on the line $y$—$y$ in Fig. 5. Fig. 7 is a detail end view, and Fig. 8 is a detail side view, of one of the locking segments. Fig. 9 is a detail side view, and Fig. 10 is a plan view, of the locking-key or pin. Fig. 11 is a detail end view of one of the bearing-rings, and Fig. 12 is a cross section of the same taken along the line $z$—$z$ in Fig. 11.

Two similar coupling-members 2 are provided having hubs 3 which are adapted to be secured on the two shafts to be coupled in any approved manner. Each coupling-member has an external spherical portion 4, and longitudinally projecting jaws 5. The jaws of one coupling-member are arranged intermediate of the jaws of the other coupling-member, and antifriction driving balls 6 are interposed between the jaws. The drawing shows a coupling each member of which has one pair of jaws. More than one pair of jaws may be provided, if desirable, and the number of driving balls can be accordingly increased.

Each coupling-member has a spherical socket 7 which engages with a single large ball 8 common to both sockets, and having its center arranged on the axis or axes of the two hubs. Each coupling-member has also a ball-race 9 where the hub joins onto the socket, and 10 are antifriction balls arranged in the ball-race 9 between the large central ball 8 and the coupling-member.

The coupling-members are prevented from separating by means of two similar bearing-rings 12. Each bearing-ring has a flange 14 at one end which has a spherical portion 16 which encircles the spherical portion 4 of the coupling-member adjacent to it. Each bearing-ring has also a ball-race 17 at its other end which engages with the projecting portions of the driving balls 6. These driving balls 6 are arranged to run in contact with the large central ball 8 and the ball races 17, as well as being in contact with the jaws of the coupling-members. The jaws of the coupling-members hold the driving balls 6 spaced at suitable distances apart from each other. Each bearing-ring 12 has also a ball-race 18 adjacent to its flange, and 19 are balls arranged in the ball races 18 and running in contact with the spherical surface 4.

The two bearing-rings 12 are provided with fastening devices which secure them together, and each ring preferably has an annular rib or shoulder 20. Channel-shaped segments 21 are provided having shoulders 22 at their ends which engage with the shoulders 20 of the two bearing-rings. Each segment is a little less than a semicircle, and the two segments abut against each other at one end, leaving an open space between their other ends.

A locking-ring 24 is slid over the two segments 21 after they have been placed in position on the bearing-rings, and a spring locking-key or pin 25 is inserted in the space between the ends of the locking-segments and between the bearing-rings and the locking-ring. This locking-key preferably has a head 26 at one end, and its main portion is formed of two tapering tongues of resilient material which project from the head 26 and are arranged side by side. These tongues have lugs 27 at their free ends or end portions which project in opposite directions. These lugs 27 spring in opposite directions after the key has been slipped into place, and prevent the key from working loose under normal conditions. The key can be removed by hand whenever it is desired to separate the coupling-members.

A coupling constructed according to this invention works with very little friction, and rotary motion is transmitted from one shaft to another shaft, whose axis lies at an angle to the first shaft, without any intermittent or jerky motion. The bearing-rings adapt themselves automatically to all changes of alinement, and as the balls of the various ball-bearings are always at liberty to select their own positions or planes of rotation, the friction between the various working parts is minimized.

What I claim is:

1. In a flexible coupling, the combination, with a pair of coupling-members provided with sockets and overlapping jaws, of a central ball arranged in the said sockets, bearing-rings provided with ball-races at their adjacent end portions, said rings being secured together and arranged to encircle the said sockets and jaws, and driving balls alternately arranged between the overlapping portions of the said jaws and running on the central ball and in the ball-races.

2. In a flexible coupling, the combination, with a pair of coupling-members provided with sockets and overlapping jaws, of a central ball arranged in the said sockets, bearing-rings provided with ball-races at their adjacent end portions, said rings being secured together and arranged to encircle the said sockets and jaws, and driving balls arranged between the overlapping portions of the said jaws and running on the central ball and in the ball-races.

3. In a flexible coupling, the combination, with a pair of coupling-members provided with sockets and overlapping jaws, of a central ball arranged in the said sockets, ball-bearings arranged in the said sockets between the central ball and the coupling-members, bearing-rings provided with ball-races at their adjacent end portions, said rings being secured together and arranged to encircle the said sockets and jaws, and driving balls arranged between the overlapping portions of the said jaws and running on the central ball and in the ball-races.

4. In a flexible coupling, the combination, with a pair of coupling-members provided with sockets having external spherical surfaces and overlapping jaws, of a central ball arranged in the said sockets, bearing-rings provided with ball-races at their adjacent end portions, said rings being secured together and arranged to encircle the said sockets and jaws, ball bearings arranged between the said rings and spherical surfaces, and driving balls arranged between the overlapping portions of the said jaws and running on the central ball and in the said ball-races.

5. In a flexible coupling, the combination, with a pair of coupling-members provided with sockets having external spherical surfaces and overlapping jaws, of a central ball arranged in the said sockets, bearing-rings provided with ball-races at their adjacent end portions, said rings being secured together and arranged to encircle the said sockets ad jaws, driving balls arranged between the overlapping portions of the jaws and running on the central ball and in the said ball-races, and ball bearings interposed between the said bearing-rings and spherical surfaces and also between the said central ball and the sockets of the coupling members.

6. In a flexible coupling, the combination, with a pair of coupling members provided with articulated connecting devices which permit the coupling members to operate when axially out of line with each other, of bearing-rings operatively connecting the said coupling members and provided with external shoulders, locking-segments provided with shoulders which engage with the aforesaid shoulders, a locking ring encircling the locking-segments, and a locking-pin arranged between the ends of two segments and engaging with the locking ring and the shoulders on the bearing-rings.

DEWITT TAPPAN.

Witnesses:
JAMES M. GLEASON,
JOHN H. MCMAHON.